United States Patent [19]
Allen et al.

[11] Patent Number: 6,135,531
[45] Date of Patent: Oct. 24, 2000

[54] TRUCK TRAILER SCUFF LINER

[75] Inventors: James Allen; Elton Jones, both of Greenville; Charles Schroeder, Monroeville, all of Ala.; Gregory D. Johnson, Zionsville, Ind.

[73] Assignees: International Paper Company, Purchase, N.Y.; J. M. McCormick, Co., Inc., Indianapolis, Ind.

[21] Appl. No.: 08/858,165

[22] Filed: Apr. 18, 1997

[51] Int. Cl.[7] ................................................. B60R 13/01
[52] U.S. Cl. .......................................... 296/39.1; 52/290
[58] Field of Search ............................ 296/39.1; 52/290, 52/583.1, 592.1, 578, 574; 105/423

[56] References Cited

U.S. PATENT DOCUMENTS

| | | | |
|---|---|---|---|
| 1,585,960 | 5/1926 | Baum | 52/290 |
| 1,674,725 | 6/1928 | Huebner | 52/290 |
| 1,701,714 | 2/1929 | Ballenger | 52/290 |
| 2,208,450 | 7/1940 | Dietrich | 105/423 |
| 2,526,116 | 10/1950 | Browne | 105/423 |
| 3,804,436 | 4/1974 | Ehrlich | 280/179 |
| 3,991,535 | 11/1976 | Keller et al. | 52/642 |
| 4,357,047 | 11/1982 | Katz | 296/181 |
| 5,030,488 | 7/1991 | Sobolev | 428/35.9 |
| 5,041,322 | 8/1991 | Fouquet | 428/106 |
| 5,219,629 | 6/1993 | Sobolev | 428/35.9 |
| 5,618,602 | 4/1997 | Nelson | 52/592.1 |
| 5,755,088 | 5/1998 | Ormiston | 52/589.1 |

FOREIGN PATENT DOCUMENTS

| | | | |
|---|---|---|---|
| 334937 | 2/1959 | Switzerland | 52/290 |

*Primary Examiner*—Joseph D. Pape
*Assistant Examiner*—Kiran Patel
*Attorney, Agent, or Firm*—Watov & Kipnes, P.C.

[57] ABSTRACT

A truck trailer scuff liner formed from parallel grained laminated veneer panel adapted to be bolted to the insides and nose of a dry wall van trailer. The sections of the laminated veneer panel are secured together by a finger joint arrangement in which strength and elasticity are preserved. A laminated wood veneer beam is formed by attaching a plurality of panels to each other and then attaching the bound panels to each other.

11 Claims, 4 Drawing Sheets

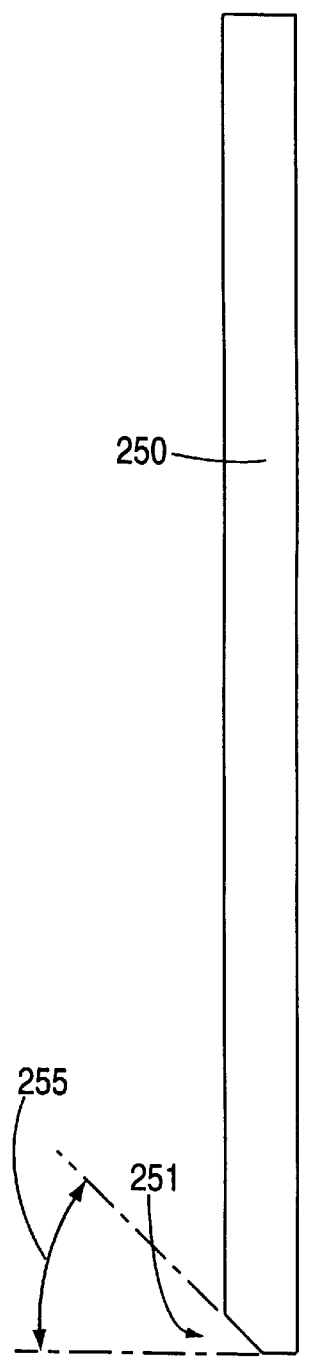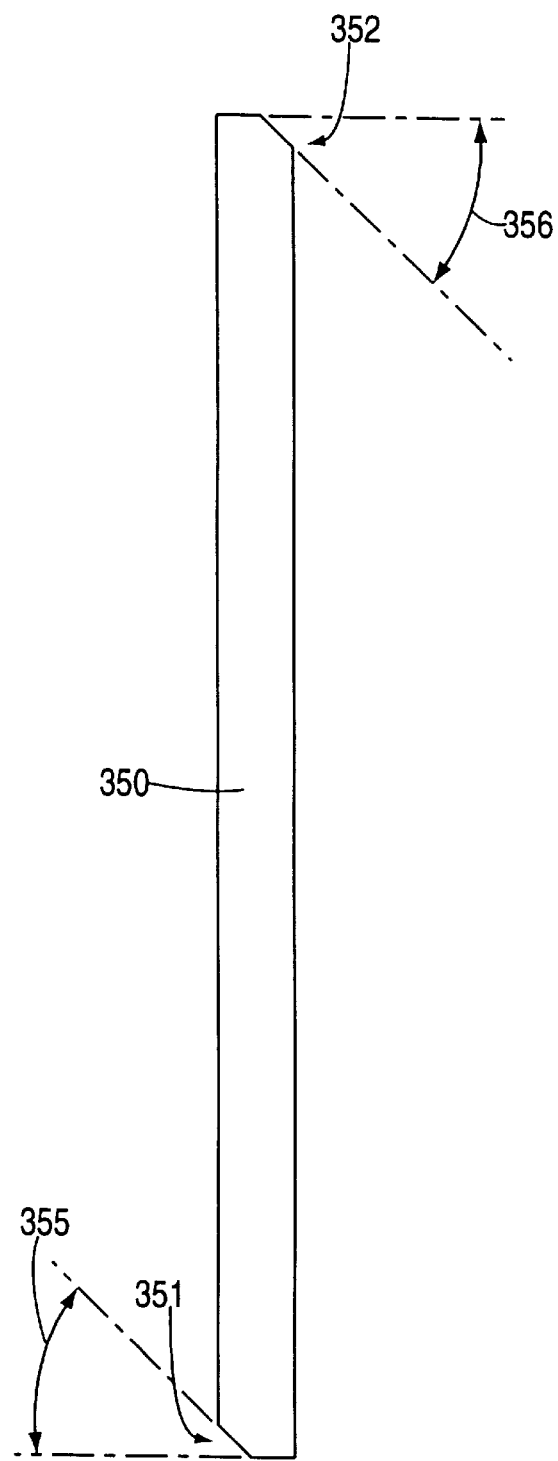
FIG. 7
FIG. 8

TRUCK TRAILER SCUFF LINER

BACKGROUND OF THE INVENTION

The invention is generally directed to a truck trailer scuff liner and in particular to a scuff liner suitable for use inside a truck trailer formed of parallel laminated veneer panels secured lengthwise in sections utilizing a finger joint or other suitable enhanced connection. The invention is also directed to a beam or beams formed of laminated veneer panels secured lengthwise in sections utilizing a finger joint or other suitable enhanced connection.

In the trucking industry goods are traditionally moved in large trailers or dry wall vans, commonly known as tractor trailers, which are essentially large rectangular containers on wheels. The goods placed into these truck trailers are often on pallets and are thus maneuvered, stacked, loaded and unloaded by use of forklifts which drive into the truck trailer generally off of the loading dock of a factory or warehouse, drive within the trailer and then exit the trailer prior to transport.

In the use of forklifts, which are heavy motorized pieces of equipment which are maneuverable and have two large metal tongues extending from the front of the forklift truck which are parallel and which may be raised and lowered as desired by the forklift operator, substantial power and force is generated by these forklift machines whether unladen or whether supporting one or more pallets containing goods on the forks of the forklift. The truck trailers on the other hand are relatively light weight, thin and relatively fragile walled structures designed more to provide a shell surrounding the goods stored in the trailer rather than providing structural support or containment of the goods. Indeed, the walls of the tractor trailer are easily pierced and damaged by the forklift forks or even the palletized goods moved by the fork lift operators. In many cases the shell of the truck trailer, particularly the side walls and the front or nose wall, opposite the entrance of the truck trailer, are often damaged through mishandling by the forklift operators. In addition, the forklift operators traditionally will enter the truck trailer at one or the other of the sides and run along the sidewall of the trailer so as to square up the pallet or pallets on the forklift so that the palletized goods may be neatly and efficiently stowed within the truck trailer. In doing so, the trailer sides are often damaged.

In an effort to resolve this problem scuff liners for truck trailers have been created which lie along the sides and along the front wall of the truck trailer on its inside at the region where the side and front walls meet the floor of the truck trailer. In the past, various types of truck trailer scuff liners have been generally available. These scuff liners have been of two basic types. The first is made of a sheet of galvanized metal. The other is formed of solid oak wood formed of thin strips of the wood, connected in the same way as the oak flooring of the trucks which is generally done by a series of parallel, irregularly length ¾ inch wide strips glued together end to end and side to side to form the desired width and length. The scuff liner is then placed up against the side walls of the truck trailer and bolted in place.

However, there are several problems inherent in the construction noted. First, the use of small slats of wood glued together both end to end and side to side is expensive and difficult to assemble and has relatively poor bending and rupture characteristics. Accordingly, there is a need for an improved truck trailer scuff liner which can be manufactured more inexpensively, with a stronger structure and with improved bending characteristics which will extend the useful life of the scuff liner and better protect the truck trailer from damage. There is also a need for an improved beam which has the benefits of a solid wood beam without the cost and difficulty of locating appropriately sized beams.

SUMMARY OF THE INVENTION

The invention is generally directed to a parallel laminated veneer truck trailer scuff liner formed of a plurality of thin wood panels aligned along the grain, joined by glue and pressed to form a solid panel which is cut to an appropriate width and then joined by finger joint into a suitably long section which is then secured to each side wall and the front wall at the inside of a truck trailer at the section at the base and adjoining vertical interior wall whereby protection of the truck trailer is provided against damage caused by a forklift truck or palletized fixture in handling.

The invention is also directed to a laminated veneer lumber beam including at least one wood panel having a panel length dimension, a panel width dimension and a panel thickness dimension, the panel length dimension being greater than the panel width dimension and the panel width dimension being greater than the panel thickness dimension, the thickness of the panel comprising a plurality of layers of hardwood veneer each of which has a grain extending along the panel length dimension, the plurality of hardwood veneer layers being bonded together to form the panel.

Still another goal of the invention is to provide an improved laminated veneer lumber beam consisting of at least two panels linked together with a joint.

Yet another goal of the invention is to provide an improved laminated veneer lumber beam where a series of panels formed of a plurality of layers of hardwood veneer, each of the hardwood veneer layers having a grain extending along the panel length dimension is formed utilizing finger joints to connect the panels.

It is another goal of the invention to provide an improved truck trailer scuff liner formed from parallel laminated veneer panels coupled with a finger joint or other engaging connection.

It is still another goal of the invention is to provide an improved truck trailer scuff liner in which the strength and bending characteristics of the scuff liner are improved through use of parallel laminated veneer panels.

Yet a further goal of the invention is to provide an improved truck trailer scuff liner in which the panels of parallel laminated veneer are secured through use of a joint procedure, such as a finger joint, which makes a bond at the joint at least as strong as the wood itself.

Still yet a further goal of the invention is to provide an improved and more durable truck trailer scuff liner which is adapted to fit truck trailers of various types, including trailers incorporating a bead weld line between the base and side walls and vertical slats secured to the studs on the inside of the truck trailer.

Still other goals and advantages of the invention will, in part, be obvious and will, in part, be apparent from the specification.

The invention accordingly comprises the features of construction, combinations of elements and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following descriptions taken in connection with the accompanying drawings, in which:

FIG. 7 is an end view of a panel of a scuff liner constructed in accordance with a preferred embodiment of the invention;

FIG. 8 is an end view, similar to the view in FIG. 7, constructed in accordance with another preferred embodiment of the invention;

DETAILED DESCRIPTION OF THE PREFERRED EMBODIMENTS

Figure 1:
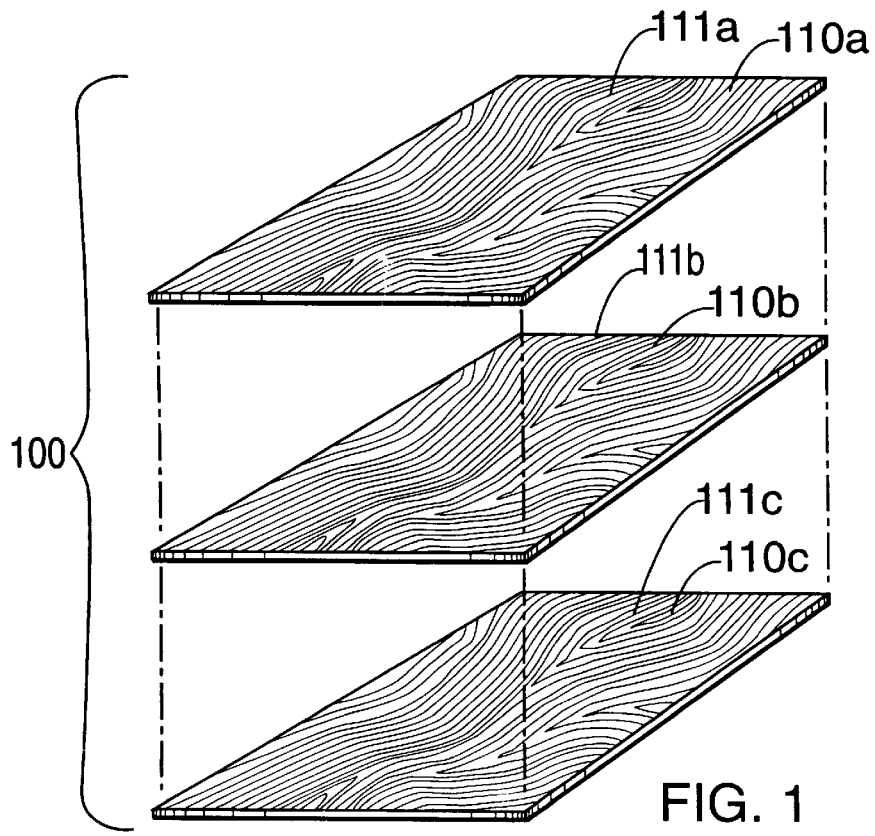
FIG. 1 is an exploded perspective view of the wood components of a parallel laminated veneer panel prior to assembly in accordance with a preferred bonding invention.

Reference is first made to FIG. 1 wherein a parallel laminated veneer panel, generally indicated as 100 constructed in accordance with a preferred embodiment of the invention, prior to assembly, is shown. For ease of description three veneer panels 110a, 110b and 110c are shown. In practice, different numbers of layers may be utilized. Currently, for a ¾ inch thick parallel laminated veneer panel about six layers are utilized. However, a greater or lesser number of layers may be utilized for thickness control.

The key aspect of the parallel laminated veneer panel is that it is created with the grain of the woods of each of the laminated veneer layers 111a, 111b, 111c, positioned so that the grain of the wood runs parallel along the length of the plane of the laminated veneer panel. This is contrasted with plywood in which alternating layers of veneer have the grain of the wood rotated ninety degrees to create more structural rigidity across the plane of the plywood, but less strength and bending moment.

In a preferred embodiment, parallel laminated veneer panel sections 110a, 110b and 110c are layed up using a 0.125–0.130 inch thick oak veneer pealed on a rotary lathe. The veneers are dried to approximately 7% moisture content and assembled on a curtain coater using a phenol-formaldehyde resin mixture including additives and chemicals to promote viscosity and cure features of the resin mixture.

Figure 2:
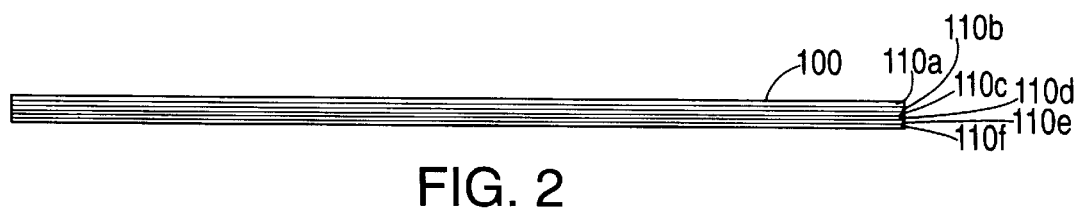
FIG. 2 is a front elevational view of the end of a panel of parallel laminated veneer constructed in accordance with a preferred embodiment of the invention.
Figure 3:
FIG. 3 is a side elevational view of the panel of parallel laminated veneer of FIG. 2.

In the preferred embodiment shown in FIGS. 2 and 3, each panel 100 includes six layers 110a, 110b, 110c, 110d, 110e and 110f of 0.125–0.130 inches thickness of dried oak veneer with approximately 40 lbs/msf of resin mixture applied to each sheet of veneer. The panels are pressed in a hot press using heat and pressure to cure the adhesive. Each panel, before and after hot-pressing, is approximately four feet by eight feet. After a hot-pressing operation, a ¾ inch thick panel is sawed to a series of sections 120, each having a width of about 11.250 inches by 96 inches (8 feet).

Reference is made to FIGS. 2 and 3 wherein a front elevational view of the end of panel 100 of parallel laminated veneer constructed in accordance with the invention and a side elevational view of panel 100 are shown.

The bonding material utilized is a mixture including water, soda ash, lignoflex, wheat flour, caustic soda and resin. A current preferred embodiment utilizes a phenolic plywood resin such as Georgia Pacific's G-P6778 phenolic plywood resin CAS No. 40798-65-0 and CAS No. 7732-18-5. Other similar resins can be substituted. Again, in a preferred embodiment, the resin constitutes about ⅔ by weight of the total weight of the total mix weight.

Although the thickness dimension of section 120 of FIGS. 2 and 3 has six layers and is designed to have a finished thickness of $^{23}/_{32}$ inches, other thicknesses can be made. Other thicknesses which may be substituted easily are ⅝ths of an inch, ¾ths of an inch and 1 inch. Panel thickness is controlled by the number of veneers used in assembly, the veneer thickness, and sanding pressed panels to specified thicknesses. (Panels are touch sanded for smoothness and thickness control.)

Following the pressing and curing of the laminated veneer panels 100, they are sanded to control thickness tolerances. Next, panels are sawed into sections which are 11.25 inches by 8 feet to form a series of panels 120, each of which is about 8 feet long. This length is not critical but provides a suitable working length which is conveniently formed and handled.

For the use as a truck trailer scuff liner, the panels 120 must be made into considerably longer sections to fit along the length of the sides of the inside of a truck trailer. Accordingly, there is a need to connect the 8 foot panels 120 together in a fashion which preserves the strength and flexibility of the individual parallel laminated veneer sections. This strength is concentrated along the length of the sections 120 with the grain of the panel lined up. While the grain of the panel is lined up this does not mean that adjacent veneers taken from the same piece of wood are placed up against each other. Instead, the grain may still align if the wood panel is rotated 180 degrees. Also, by shuffling the order in which the veneers are attached and by rotating the panels 180 degrees, end to end, the benefits of the aligned grain are achieved and several additional benefits are also reaped. Solid wood is generally fairly strong but has natural imperfections in the wood. These naturally occurring imperfections weaken the strength of the wood surrounding these areas. The imperfections may be holes, knots or other irregularities which naturally occur. These irregularities tend to weaken the overall strength of the wood in connection with bending and end to end strength. However, by first peeling the wood into thin veneers, the imperfections are divided up by layer and by shuffling the order in which the veneers are reassembled and rotating some of the veneers 180 degrees, the negative effect of the imperfections is minimized by distributing them randomly throughout the panel, rather than having them concentrated in one spot, as would be present in a whole, uncut piece of wood. In addition, the parallel laminated veneer may be formed from smaller diameter trees than would otherwise be required.

Figure 4:
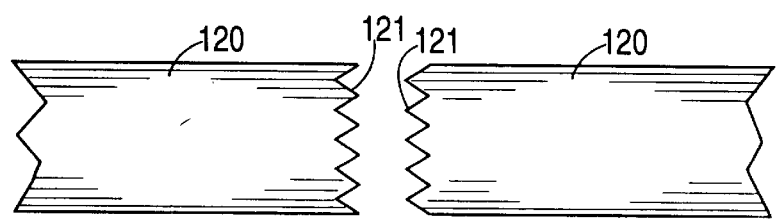
FIG. 4 is a partially cut away side elevational view of two panels of parallel laminated veneer panels prepared to be joined with a finger joint in accordance with a preferred embodiment of the invention.

Preparations are required for joining sections 120 into longer beams for use as the truck trailer scuff liner or other uses such as long throw beams in building construction. Adjoining ends of sections 120 are cut with mating finger jointed ends 121 as shown in FIG. 4. The finger joints are cut with the fingers appearing on the wide face of the laminations. In another preferred embodiment the finger joints are cut with the fingers appearing on the narrow face of the laminations, i.e. FIGS. 4 and 5 would be top plan views of the beam. Various shaped finger joints may be utilized. Mating finger jointed ends 121 are joined in accordance with an appropriate glue and curing procedures. In a current preferred embodiment a series of six 8 foot sections 120 are glued together utilizing, for example, Bordon's melamine based MF600 resin and FM368 catalysts. The joints are cured in a radio frequency tunnel oven with curing taking place in approximately 20 seconds of travel and the glue line temperature reaching about 200 degrees Fahrenheit. This has the effect of curing the adhesive in the joint. Light sanding then removes excess glue and produces a smooth finish and regular sizing.

The finger joint connection has the effect of producing a mechanical connection in addition to the connection provided by the glue. The bond is established so as to provide an allowable stress in tension of 2,600 lbs. per square inch. Generally, full size end joint testing in accordance with AITC test T-119 as described in product standard PS56-73 for end joints is followed. The joint configuration in the preferred embodiments is 1.113 inches L×0.030 inches tip thickness×0.25 inches pitch. The effect of this joining is to create an arrangement in which the bond between sections 120 is at least as strong as the strength of the sections themselves. In practice, the bond is generally stiffer than the wood section 120.

Figure 5:
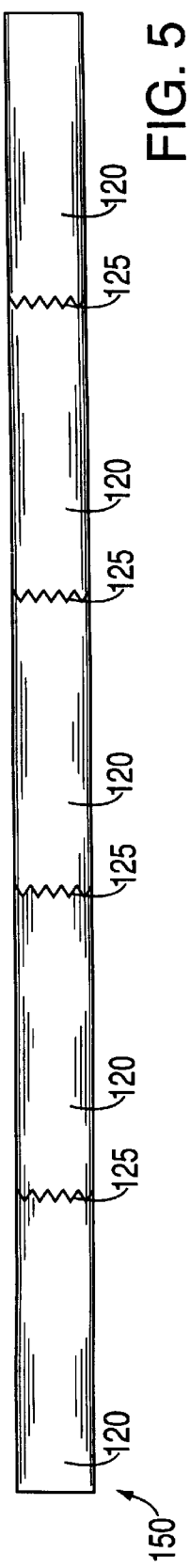
FIG. 5 is a side elevational view of a laminated veneer lumber beam which may be used as a truck trailer scuff liner beam constructed in accordance with a preferred embodiment of the invention.

Reference is next made to FIG. 5 wherein a beam 150 consisting of five sections 120 finger joined together at joint 125 is shown. In practice, 5, 6 or however many sections 120 as are necessary to achieve the required length of beam 150 for the particular application are joined. Beam 150 in the embodiment shown would be about 40 feet long, 11.25 inches wide by ¾ of an inch thick. The figure is not drawn to scale but is drawn to highlight the orientation and structure of beam 150. Depending upon the length of the truck trailer, longer or shorter or narrower or wider beams 150 would be created. Obviously, to the extent that the length of the trailer is not an even multiple of 8 feet, the beam 150 would be cut down to the actual length as needed.

Testing was done to compare the oak parallel laminated veneer scuff liner beams, including structural finger joints, where bending was perpendicular to the face grain and finger joint and was conducted in the midpoint of a span. A similar test was run on the prior art oak flooring used as scuff liner oriented flatwise with bending perpendicular to the face grain.

The modulus of elasticity of the parallel laminated veneer including the finger joint, using well formed finger joints in accordance with the preferred embodiment of the invention, in the midpoint of the span appeared to be equal to or greater than the modulus of elasticity for the prior art oak flooring. In actual use, the stresses which the scuff liner is subjected to are more accurately reflected by the modulus of elasticity. This is due to the side panel construction of most truck trailers which have a series of regularly spaced studs along the side of the truck trailer to which the scuff liner is attached. As a result, to prevent against stresses and damage to the skin of the truck trailer, the scuff liner must prevent undue bending of the scuff liner from damaging the skin.

It was further noted that the desirable elasticity results were achieved with the parallel laminated veneer at a thickness of $^{23}/_{32}$" as compared to the prior art ¾" product. Also, the parallel laminated veneer product was found to be less dense by a factor of more than 3%. Between the thickness difference and the density difference, the weight of the product is reduced by about 10% from the prior art product. This is extremely valuable in both shipping the product, because of the relatively high weight of the product, and even more so in the truck operations where additional weight translates into increased fuel usage. Also, with a lighter weight more cargo can be carried under the gross weight limits. By using the lighter scuff liner constructed in accordance with the invention, the user can save substantial fuel costs during the life of the product and haul more payload.

Figure 6:
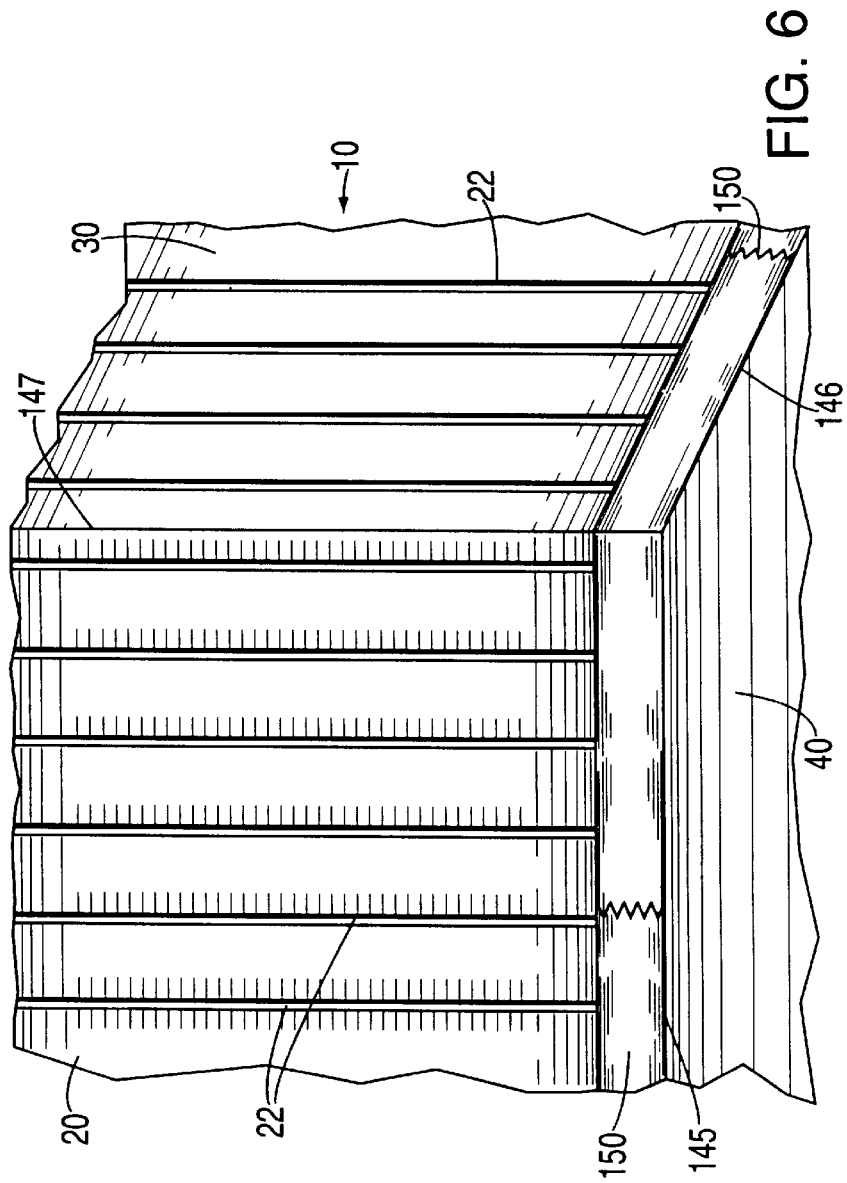
FIG. 6 is a partially cut away perspective view of one side wall, the back wall and the floor of a truck trailer having a scuff liner constructed in accordance with a preferred embodiment of the invention.

Reference is next made to FIG. 6 wherein a cutaway perspective view of the inside of a truck trailer 10, including a scuff liner constructed in accordance with a further embodiment of the invention is depicted. The truck trailer includes a side wall 20 and the front or nose wall 30. In addition, there is another side wall (not shown) and a ceiling (not shown). Finally, there is a door structure (not shown) on the opposite end from nose wall 30. Generally, floor 40 is formed with a series of generally narrow, ¾ inch wide irregular length oak flooring boards which are glued together side to side and end to end to form a solid, flat and durable floor for the trailer. The side wall 20 and nose wall 30 are formed with a series of aluminum studs 22 which are regularly spaced in a vertical orientation along the side and around the front of side wall 20 and nose wall 30. Generally, the studs may be set at standard distances such as 24 inches or 16 inches between adjacent studs. Side wall 20 meets floor 40 in a joint 145. Side wall 20 meets nose wall 30 at joint 147 and nose wall 30 meets floor 40 at joint 146. Generally, the construction of the trailer includes a welding bead along each of joints 145, 146 and 147. Generally, a separate beam 150 is cut to size for each of the two side walls 20 and for nose wall 30 in a truck trailer. Then, the beams 150 are bolted, screwed or otherwise attached to studs 22 along the base of side walls 20 and nose wall 30 as shown in FIG. 6.

Reference is next made to FIG. 7 wherein an end view of a beam 150 constructed in accordance with another preferred embodiment of the invention is depicted. Beam 250 is shown with a beveled section having an angle 255 in a preferred embodiment equal to 45 degrees at the lower left corner of the beam 250. Generally, this bevel runs along the entire length of the beam 250. This bevel, which in a preferred embodiment extends for about half of the thickness of beam 250 allows beam 250 to be pressed up against the side wall of the truck trailer without the welding bead along joint 145 preventing flat contact. In practice, the welded bead fits within the beveled out portion 251. The scuff liner will not function properly unless it can lay flat against the side wall studs 22.

Reference is next made to FIG. 8 wherein a beam 350 constructed in accordance with another preferred embodiment of the invention is depicted. Beam 350 includes a beveled portion 351 removed from the lower corner of beam 350, as with beveled portion 251 in FIG. 7. Likewise, angle 355, in a preferred embodiment, is equal to about 45 degrees. It may vary, depending upon the size and location of the welded bead. However, in addition to the lower beveled portion 351, beam 350 includes an upper beveled portion 352 adapted to face the inside of the trailer rather than the side walls and studs of the trailer. Beveled portion 352 at the top is cut at an angle 356 which in a preferred embodiment is equal to about 45 degrees. Beveled portion 352 is established to prevent a forklift from cracking beam 350 as it lowers on top of beam 350. The beveled portion 352 causes the forklift fork to slide laterally across the beveled portion 352, thereby preventing damage to beam 350 in operation. Because it is expected that over time the scuff liner 150 will need to be replaced, the durability of the scuff liner enhances its value.

Figure 9:
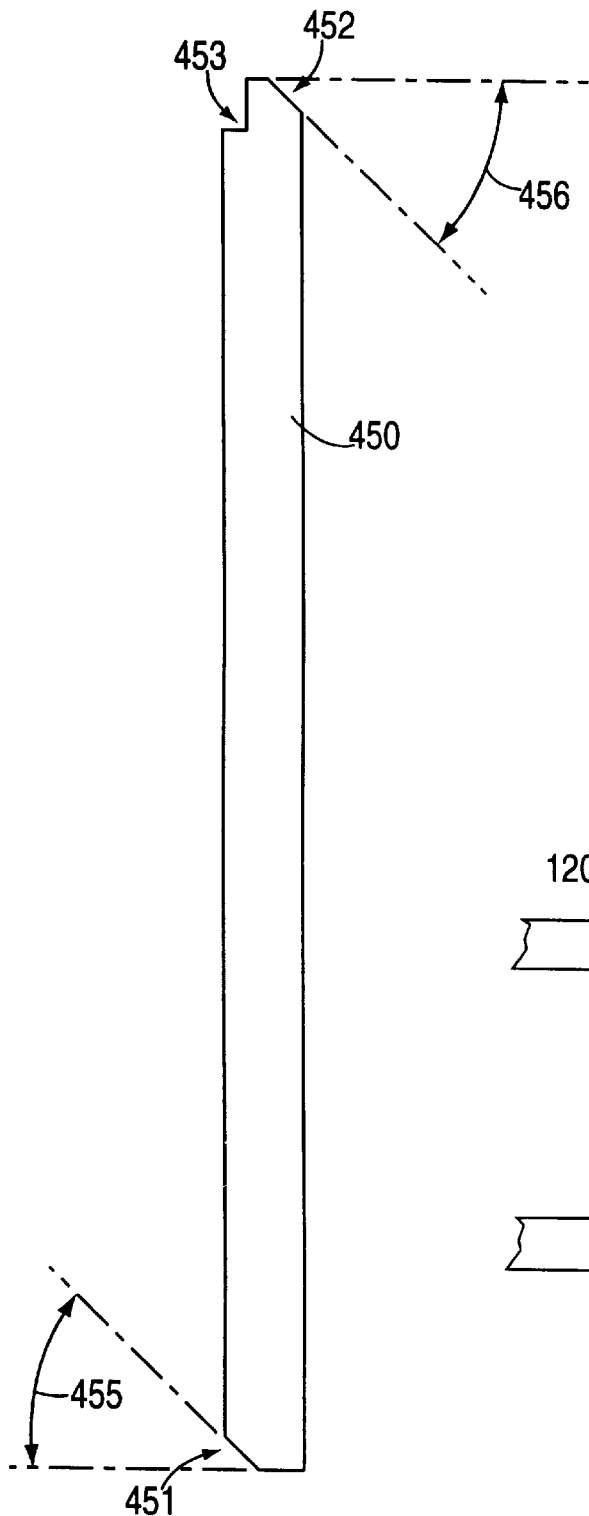
FIG. 9 is an end view, similar to the view in FIG. 7 and FIG. 8 constructed in accordance with another preferred embodiment of the invention.

Reference is next made to FIG. 9 wherein a beam 450 constructed in accordance with a further preferred embodiment of the invention is depicted. Beam 450 includes a lower beveled portion 451 with a bevel angle 455 which in a preferred embodiment is about 45 degrees. Beam 450 also includes an upper beveled portion 452 having an upper beveling angle 456 of about 45 degrees. Beam 450, however, also includes a further plywood groove 453 running along the top of beam 450 on the side intended to rest up against side wall 20 of the truck trailer. Plywood groove 453 is set up to receive plywood strips which are commonly attached to the studs 22 along the sides 20 and nose wall 30 of the truck trailer. These plywood strips are generally ¼ inch plywood product bolted to the wall from the roof down to a height of about 11.25 inches. Plywood groove 453 assures that the scuff liner 450 rests up against the side walls and is not angled forward by the plywood panels. In this way the scuff liner 450 can rest flat up against the wall and serve its useful function without placing additional stresses on the product.

In addition to the beveling and plywood groove found, the end of the beams 450 can either be beveled so as to fit smoothly together at the corner or may be set up with square ends so that the side panels extend all the way to make contact with the nose wall 30 and the nose beam 150 has square ends which rest up against the sides of beam 150 for the side walls. To the extent that there are other obstructions in a trailer in or around the area covered and protected by scuff liner 150, the beams 150, 250, 350, 450 may be further modified to assure that the beams lay flat against the side walls and studs of the trailer.

Figure 10:
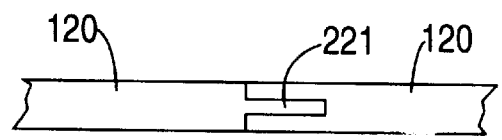
FIG. 10 is a partially cut away side elevational view of a tongue and groove joint for connecting sections of the parallel laminated veneer panel in accordance with another preferred embodiment of the invention.
Figure 11:
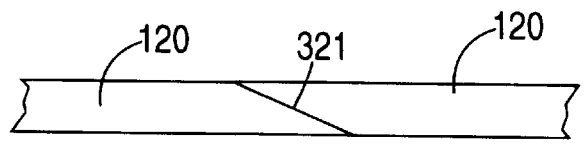
FIG. 11 is a partially cut away side elevational view of a scarf joint for connecting sections of the parallel laminated veneer panels in accordance with another preferred embodiment of the invention.
Figure 12:
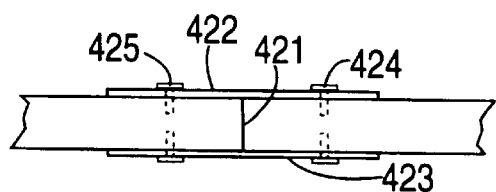
FIG. 12 is a partially cut away side elevational view of a further connection approach for joining sections of the parallel laminated veneer panels in accordance with the invention.

Reference is next made to FIGS. 10, 11 and 12 wherein alternate means for connecting sections 120 together to form beams 150 are depicted. FIG. 10 shows a tongue and groove joint 221 connecting two sections 120. FIG. 11 shows a scarf joint 321 joining two sections 120 and FIG. 12 shows an embodiment in which a bare end-to-end joint 421 is maintained by two panels or sheets 422, 423, which may be formed of either wood or metal and are secured together by bolts 424, 425 as shown. Other approaches which exhibit a mechanical advantage as compared to a simple end-to-end attachment may similarly be utilized.

Accordingly, a parallel laminated veneer beam formed from two or more panels joined end to end with a suitable joint is provided.

Accordingly, an improved truck trailer scuff liner formed from parallel laminated veneer is also provided for use in the base of the walls of drive and commercial trailers. The scuff liner prevents forklift damage within the trailer. Forklifts are used to load trailers and often hit the inside walls of the vans at the base where the walls meet the floor. The scuff liner provides a restraint to these loads similar to the baseboards on the walls of homes. The parallel laminated veneer scuff liners showed more uniform strength profiles with less variation than samples of oak glued laminated flooring currently used by trailer manufacturers as scuff liner. In addition, the modulus of elasticity values for the parallel laminated veneer scuff liners constructed in accordance with the invention showed measurably higher values than the oak flooring materials.

Accordingly, it will thus be seen that the objects set forth above, among those made apparent from the preceding description are efficiently attained and, since certain changes may be made in the above constructions without departing from the spirit and scope of the invention, it is intended that all of the matter contained in the above description or shown in the accompanying drawings, shall be interpreted as illustrative, and not as limiting.

It will also be understood that the following claims are intended to cover all of the generic and specific features of the invention, herein described, and all statements of the scope of the invention which, as a matter of language, might be said to fall there between.

What is claimed is:

1. A truck trailer scuff liner for attachment to the inside of a truck trailer having a series of vertically oriented studs arrayed around at least one of the side and nose walls of the truck trailer, consisting essentially of at least one liner beam having a plurality of layers of thin veneer panel, each layer of thin veneer panel having a grain extending along a length dimension thereof, said layers being joined by a bonding means into a liner beam section, linking means for joining at least two of the beam sections comprising finger joint fitting members at adjoining ends of the beam sections and adhering means for joining the fitting members and beam sections together into the liner beam.

2. The scuff liner of claim 1 having at least two liner beams.

3. The scuff liner of claim 1 further including a first bevel along the base of the liner beam adapted to rest up against a wall of the truck trailer.

4. The scuff liner of claim 1 further including a second bevel along the top edge of the liner beam adapted to face away from a wall of the truck trailer.

5. The scuff liner of claim 1 further including a groove along the top edge of the liner beam adapted to rest up against a wall of the truck trailer.

6. A laminated veneer lumber consisting essentially of at least one wood panel having a panel length dimension, a width dimension, and a panel thickness dimension said panel length dimension being greater than said panel width dimension, and said panel width dimension being greater than said panel thickness dimension, said at least one wood panel consisting essentially of a plurality of layers of a hardwood veneer, each of said hardwood veneer layers having a grain extending along said panel length dimension, said plurality of hardwood veneer layers being bonded together to form said panel.

7. The laminated veneer lumber beam of claim 6 wherein said beam has a beam length dimension, a beam width dimension, and a beam thickness dimension, said beam length dimension being greater than said width dimension and said beam width dimension being greater than said beam thickness dimension, said beam including a plurality of adjacent wood panels linked together at a joint along said panel width dimension, with said grain extending in the same direction in each of said plurality of linked wood panels and along said beam length dimension.

8. The laminated veneer lumber beam of claim 7 wherein said joint includes finger joint fitting members formed at the adjoining end of at least two of said panels and a bonding element holding said fitting joint members together.

9. The laminated veneer lumber beam of claim 6 wherein the veneer layers are up to one-quarter inch thick.

10. The laminated veneer lumber beam of claim 9 wherein said panel thickness is between one-half inch and two inches.

11. The laminated veneer lumber panel of claim 10 wherein said panel width is between one foot and four feet and said panel length is between six feet and ten feet.

* * * * *